(12) United States Patent
Makino

(10) Patent No.: US 6,857,039 B1
(45) Date of Patent: Feb. 15, 2005

(54) BI-DIRECTIONAL BUS CIRCUITRY EXECUTING BI-DIRECTIONAL DATA TRANSMISSION WHILE AVOIDING FLOATING STATE

(75) Inventor: Hiroshi Makino, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 530 days.

(21) Appl. No.: 09/615,070

(22) Filed: Jul. 12, 2000

(30) Foreign Application Priority Data

Jan. 5, 2000 (JP) ..................................... 2000-000387

(51) Int. Cl.$^7$ ............................................. G06F 13/40
(52) U.S. Cl. ..................................................... 710/305
(58) Field of Search ................................ 710/305–306, 710/106; 713/324

(56) References Cited

U.S. PATENT DOCUMENTS

| | | | |
|---|---|---|---|
| 4,974,153 A | * | 11/1990 | Pimm et al. ................ 710/306 |
| 5,842,027 A | * | 11/1998 | Oprescu et al. ............. 713/300 |

FOREIGN PATENT DOCUMENTS

| | | | | |
|---|---|---|---|---|
| JP | 63-85852 | | 4/1988 | |
| JP | 5-216818 | | 8/1993 | |
| JP | 7-38399 | | 2/1995 | |
| JP | 09205355 A | * | 8/1997 | .......... H03K/19/00 |
| JP | 11-154043 | | 6/1999 | |
| JP | 11-175463 | | 7/1999 | |

* cited by examiner

*Primary Examiner*—Paul R. Myers
(74) *Attorney, Agent, or Firm*—McDermott Will & Emery LLP

(57) ABSTRACT

A data bus included in a bi-directional bus circuitry is divided into a first bus node and a second bus node by a repeater circuit. The repeater circuit includes a first tristate buffer for amplifying and transmitting data from the first bus node to the second bus node, and a second tristate buffer connected in reverse direction. When the data bus is not used, the first and second tristate buffers are both activated, and the repeater circuit functions as a latch circuit. Therefore, in the bi-directional bus circuitry, even when the data bus is not used, the potential level of the data bus can be prevented from being left unfixed, ensuring stable operation.

13 Claims, 9 Drawing Sheets

CIRCUIT BLOCK INFORMATION

BI-DIRECTIONAL BUS CIRCUITRY EXECUTING BI-DIRECTIONAL DATA TRANSMISSION WHILE AVOIDING FLOATING STATE

BACKGROUND OF THE INVENTION

1. Field of the Invention

The present invention relate to a bi-directional bus circuitry and, more specifically, to a bi-directional bus circuitry used for a semiconductor device such as a microprocessor, capable of high speed and stable bi-directional data transmission.

2. Description of the Background Art

Along with the recent increase in scale of semiconductor devices such as an LSI and associated increase in chip size, bus lines for signal transmission within the semiconductor devices come to be longer. The longer bus line means increased parasitic resistance and parasitic capacitance, which present the problem of increased time of signal transmission over the bus lines.

When the direction of signal transmission over a bus line is limited in one direction, the speed of transmission may be improved in a relatively simple manner, by inserting a repeater circuit functioning as a signal buffer appropriately into the elongated bus line. If the signal transmission over the bus line is bi-directional, however, a repeater having a function enabling bi-directional signal amplification and a circuit block controlling direction of signal transmission in each repeater circuit (such circuit is also referred to as an arbiter circuit) are necessary.

FIG. 9 is a block diagram representing a configuration of a conventional bi-directional bus circuitry 500.

Referring to FIG. 9, bi-directional bus circuitry 500 transmits data to be input/output to and from four circuit blocks 10-a to 10-d, for example, over a data bus which is divided into bus nodes Nb1 and Nb2. The data to be transmitted on the data bus is a digital data having two signal levels, that is, a high level (hereinafter also denoted as H level) and a low level (hereinafter also denoted as L level).

Circuit blocks 10-a and 10-b are connected to bus node Nb-1, while circuit blocks 10-c and 10-d are connected to bus node Nb2. Circuit blocks 10-a to 10-d have input buffers 12-a to 12-d and output buffers 14-a to 14-d, respectively.

Bi-directional bus circuitry 500 includes a repeater circuit 50 connected between bus nodes Nb1 and Nb2. Repeater circuit 50 includes a tristate buffer 51 amplifying and transmitting a signal in a direction from bus node Nb1 to bus node Nb2, and a tristate buffer 52 amplifying and transmitting a signal in a direction from bus node Nb2 to bus node Nb1.

Tristate buffers 51 and 52 function as buffers and amplify signals, when corresponding repeater control signals CRP1 and CRP2 are active (H level), respectively. The tristate buffers are each set to a high-impedance state, when the corresponding repeater control signals are inactive (L level).

Bi-directional bus circuitry 500 further includes an arbiter circuit 520 designating a circuit block to/from which data is to be input/output and controlling direction of signal transmission of repeater circuit 50.

Arbiter circuit 520 includes a circuit block designating circuit 25 receiving circuit block information for specifying a circuit block as an object of data output and outputting circuit block designating signals CSBa to CSBd.

Arbiter circuit 520 has a logic gate LG50 providing as an output a result of an OR operation between circuit block designating signals CSBa and CSBb, and a logic gate LG52 providing as an output the result of an OR operation between circuit block designating signals CSBc and CSBd. Logic gates LG50 and LG52 generate repeater control signals CLP1 and CLP2, respectively.

Therefore, when data output is designated in either one of circuit blocks 10-a and 10-b connected to bus node Nb1, arbiter circuit 520 activates tristate buffer 51 and designates signal transmission from bus node Nb1 to bus node Nb2.

When data output is designated in either one of circuit blocks 10-c and 10-d connected to bus node Nb2, arbiter circuit 520 activates tristate buffer 52 and designates signal transmission from bus node Nb2 to bus node In FIG. 9, control signals used for data input to each of the circuit blocks are not shown for simplicity of drawings.

Because of such a configuration, even when the bus line becomes long, the direction of signal transmission is controlled and the data to be transmitted is amplified by arbiter circuit 520 and repeater circuit 50, whereby data can be transmitted at high speed over the long data bus.

In the configuration shown in FIG. 9, however, when the data bus is unused, that is, when none of the circuit blocks 10-a to 10-d connected to the data bus uses the data bus, circuit block designating signals CSBa to CSBd are all set to the inactive state (L level), and accordingly, repeater control signals CRP1 and CRP2 are also inactivated (L level). Consequently, tristate buffers 14-a to 14-d in respective circuit blocks as well as tristate buffers 51 and 52 in the repeater circuit 50 are all set to the high impedance state, so that bus nodes Nb1 and Nb2 both come to have potential levels not fixed. Such a state is generally referred to as a floating state.

With the potential level of the bus node being unfixed, the potential level of the bus node comes to be the intermediate potential, possibly causing a constant current, which will be consumed wastefully, in the input and output buffers of the circuit blocks which are connected to the bus node.

If the potential of the bus node should be higher than a power supply potential, which corresponds to the H level potential of the data or lower than the ground potential which corresponds to the L level potential of the data because of a noise or the like, there is a possibility of circuit break down in the input and output buffers of the circuit blocks connected to the bus node.

Japanese Patent Laying-Open No. 63-85852 proposes a solution to this problem of unfixed potential level of the data bus, which solution provides a bus circuitry configuration allowing fixing of the bus potential when the bus is not used.

FIG. 10 is a schematic diagram of a conventional bus circuitry allowing fixing of the bus potential when not in use.

Referring to FIG. 10, bus circuitry 600 includes n (n: natural number) tristate buffers GT1 to GTn provided corresponding to data D1 to Dn, respectively; a bus line BUS connected to an output node of each tristate buffer; a transistor QN provided between bus line BUS and a ground node; and an NOR gate GC1 for controlling ON/OFF of transistor QN.

Tristate buffers GT1 to GTn transmit corresponding data D1 to Dn to bus line BUS, in response to corresponding control signals C1 to Cn, respectively. A tristate buffer, corresponding control signal of which is inactive, is set to the high-impedance state.

In bus circuitry 600, when all control signals C1 to Cn are inactive and bus line BUS is not used, the output of NOR gate GC1 is set to the H level. Therefore, when the transistor QN is turned on, bus line BUS is connected to the ground node (potential level: GND).

More specifically, in bus circuitry 600, even when all the tristate buffers for providing corresponding data are set to the high-impedance state and bus line BUS is not used, it is possible to fix the potential level of bus line BUS at a prescribed potential level, in this example at the ground potential. Therefore, problems resulting from the unfixed potential level of the bus line BUS can be avoided.

As will be described in detail later, however, it is difficult to apply the technique for fixing the bus potential when not in use shown in FIG. 10, directly to a bi-directional bus circuitry.

SUMMARY OF THE INVENTION

An object of the present invention is to provide a configuration of a bi-directional bus circuitry capable of preventing potential level of a data bus, when the data bus is not used, from being left unfixed, and stabilizing operation.

Briefly stated, the present invention provides a bi-directional bus circuitry shared by a plurality of circuit blocks, including a data bus, a potential fixing circuit, a plurality of repeater circuits and an arbiter circuit.

The data bus is divided into (J+1) (J: natural number being 1 or more than 1) bus nodes, and each of the plurality of circuit blocks is connected to any one of (J+1) bus nodes. The potential fixing circuit is provided corresponding to one of (J+1) bus nodes, and set the potential level of the corresponding bus node to a prescribed potential when data is input/output to none of the plurality of circuit blocks. The plurality of repeater circuits are arranged between adjacent bus nodes, respectively. Each repeater circuit includes a first signal transmitting circuit transmitting data from one to the other of adjacent bus nodes, and a second signal transmitting circuit transmitting data from that the other to the one of adjacent bus nodes. The arbiter circuit is provided for receiving circuit block information for specifying a circuit block which is an object of data output, and controlling activation of the first and second transmitting circuits. When data is input to/output from none of the plurality of circuit blocks, the arbiter circuit activates one of the first and second signal transmitting circuits in each repeater circuit so that a potential level of that bus node which corresponds to the potential fixing circuit is transmitted to the entire data bus.

According to another aspect, the present invention provides a bi-directional bus circuitry shared among a plurality of circuit blocks, including a data bus, a plurality of repeater circuits and an arbiter circuit.

The data bus is divided into (J+1) (J: natural number being 1 or more than 1) bus nodes, and each of the plurality of circuit blocks is connected to any one of (J+1) bus nodes. The plurality of repeater circuits are arranged between adjacent bus nodes, respectively. Each repeater circuit includes a first signal transmitting circuit transmitting data from one to the other of adjacent bus nodes, and a second signal transmitting circuit transmitting data from that the other to the one of the adjacent bus nodes. The arbiter circuit is provided for receiving circuit information for specifying a circuit block which is an object of data output, and for controlling activation of the first and second signal transmitting circuits in each repeater circuit. The arbiter circuit activates, when data is input to/output from none of the plurality of circuit blocks, both the first and second signal transmitting circuits in each repeater circuit.

Therefore, an advantage of the present invention is that the potential level of the bus node which has been set at a prescribed potential level by the potential fixing circuit is transmitted to the entire bus nodes by each repeater circuit when the data bus is unused, so that the potential level of all the bus nodes can be set at the prescribed potential. Accordingly, the potential level of the data bus is not left unfixed when the data bus is not used, while the signal transmission rate when the data bus is used is maintained, as the parasitic capacitance of the data bus is suppressed.

Further, when the data bus is not used, each repeater circuit functions as a latch circuit to fix the potential level of each bus node.

Therefore, the potential levels of all the bus nodes can be fixed without the necessity of providing a special potential fixing circuit. As a result, the potential level of the data bus is not left unfixed when the data bus is unused, while not increasing the parasitic capacitance of the data bus.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
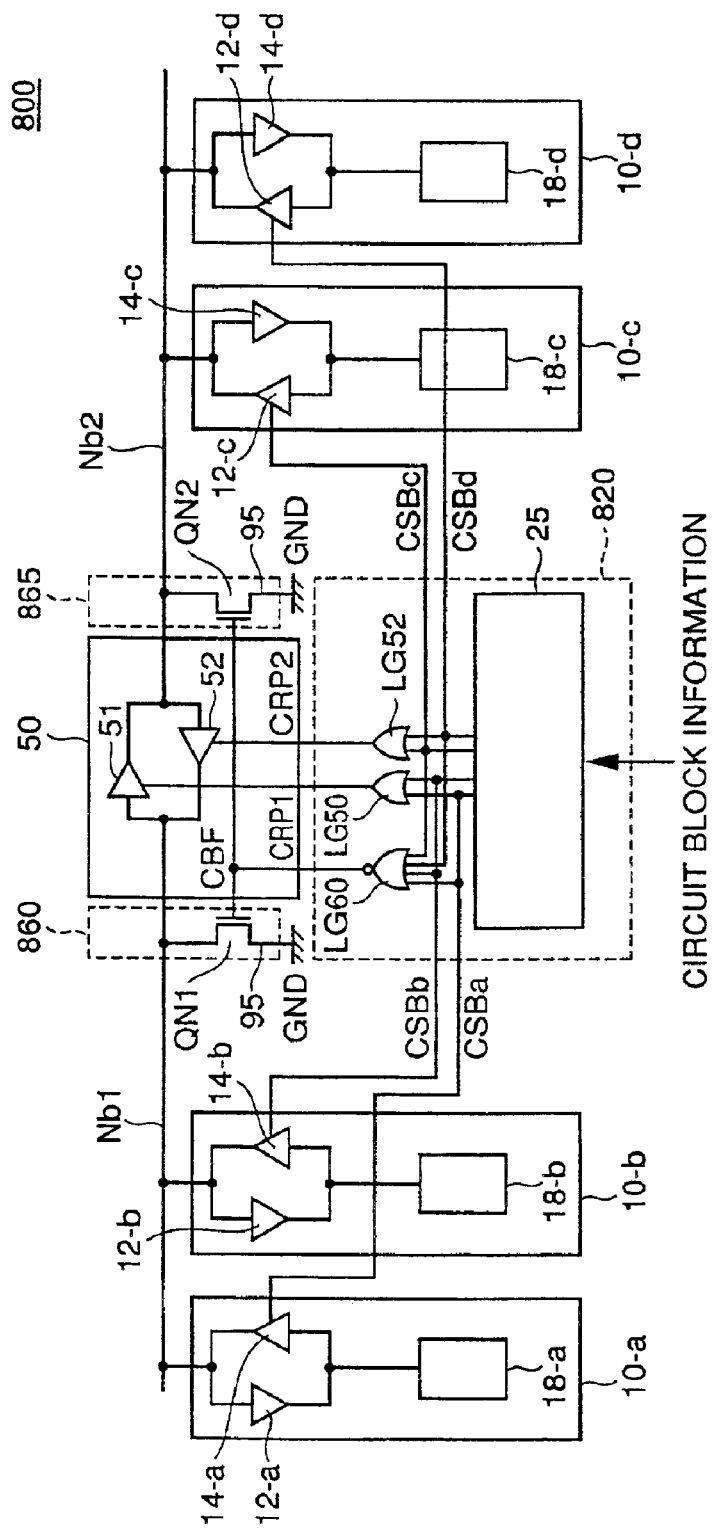
FIG. 1 is a block diagram representing a configuration of a bi-directional bus circuitry 800 in connection with a first embodiment of the present invention.

Embodiments of the present invention will be described in detail in the following with reference to the figures. Throughout the figures, corresponding portions are denoted by the same reference characters.

[Configuration of a Bi-directional Bus Circuitry Allowing Fixing of Bus Potential when the Bus is not Used]

For better understanding of the bi-directional bus circuitry in accordance with a first embodiment, a bi-directional bus circuitry 800 will be described, which is the prior art technique for fixing the potential level of the data bus when the data bus is not used shown in FIG. 10 applied directly to the bi-directional bus circuitry shown in FIG. 9.

Figure 9:
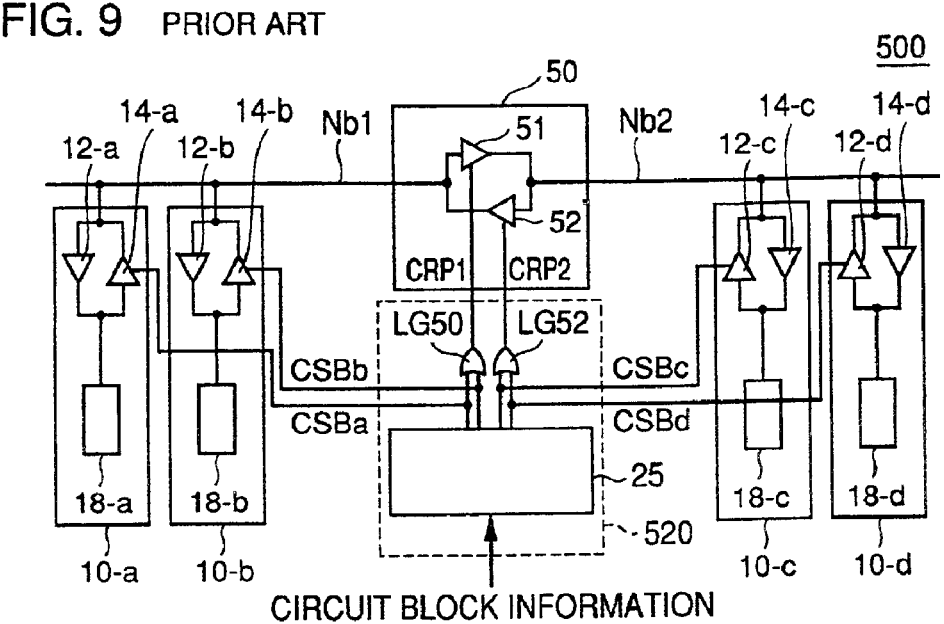
FIG. 9 is a block diagram representing a configuration of a conventional bi-directional bus circuitry 500.
Figure 10:
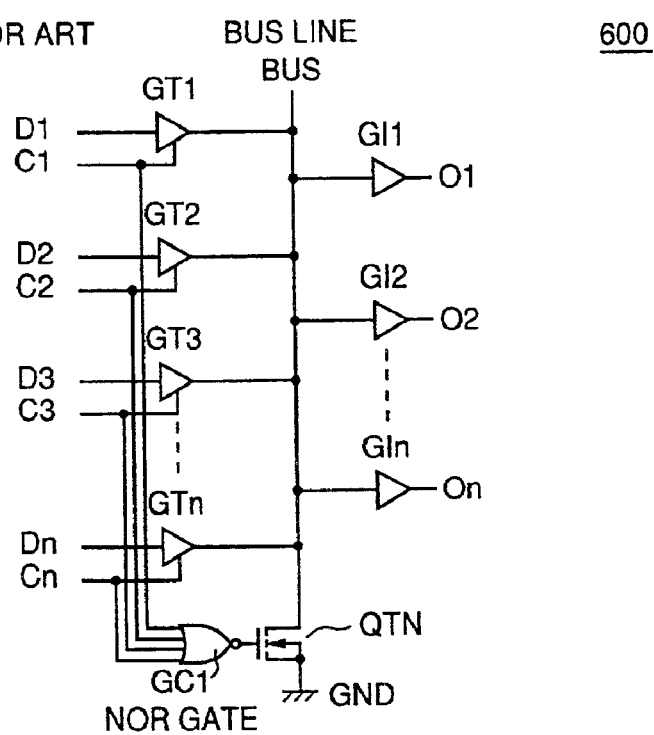
FIG. 10 is a schematic diagram of a conventional bus circuitry 600 allowing fixing of the bus potential when the bus is not used.

Referring to FIG. 1, bi-directional bus circuitry 800 transmits, similar to the bi-directional bus circuitry 500 shown in FIG. 9, the data input to/output from four circuit blocks 10-*a* to 10-*d*, for example, by the data bus divided into bus nodes Nb1 and Nb2. The data transmitted over the data bus is a digital data having two signal levels, that is, the high level (also denoted as H level) and the low level (also denoted as L level).

Bi-directional bus circuitry 800 includes a data bus which is divided into bus nodes Nb1 and Nb2, a repeater circuit 50 connected between bus nodes Nb1 and Nb2, and an arbiter circuit 820 controlling the direction of signal transmission by repeater circuit 50.

As in the case of FIG. 9, circuit blocks 10-*a* and 10-*b* are connected to bus node Nb1, and circuit blocks 10-*c* and 10-*d* are connected to bus nodes Nb2. Circuit blocks 10-*a* to 10-*d* include internal circuits 18-*a* to 18-*d*, input buffer circuits 12-*a* to 12-*d* for writing data from the bus nodes to the internal circuits, and output buffer circuits 14-*a* to 14-*d* for reading data from the internal circuits to the bus nodes, respectively.

Internal circuits 18-*a* to 18-*d* may be a memory device, a processor or the like. Circuit blocks 10-*a* to 10-*d* allows data input/output of internal circuits 18-*a* to 18-*d* from/to the outside, through the data bus.

Repeater circuit 50 includes, as in the case of FIG. 9, a tristate buffer 51 amplifying and transmitting a signal in the direction from bus node Nb1 to bus node Nb2, and a tristate buffer 52 amplifying and transmitting a signal in the direction from bus node Nb2 to bus node Nb1.

Tristate buffers 51 and 52 function as buffers and amplify signals, when corresponding repeater control signals CRP1 and CRP2 are active (H level), respectively. When the corresponding repeater control signals are inactive (L level), the tristate buffers are each set to the high-impedance state.

Arbiter circuit 820 includes a circuit block designating circuit 25 receiving circuit block information for specifying a circuit block as an object of data output and outputting circuit block designating signals CSBa to CSBd. Based on the circuit block information, circuit block designating circuit 25 activates (set to the H level) the circuit block control signal corresponding to that circuit block which is the object of data output.

Arbiter circuit 820 further includes, similar to arbiter circuit 520 shown in FIG. 9, a logic gate LG50 providing as an output the result of an OR operation between circuit block designating signals CSBa and CSBb, and a logic gate LG52 providing as an output the result of an OR operation between circuit block designating signals CSBc and CSBd.

In addition to the configuration of arbiter circuit 520, arbiter circuit 820 further includes a logic gate LG60 providing as an output the result of an NOR operation among circuit block designating signals CSBa to CSBd.

Logic gates LG50 and LG52 generate repeater control signals CRP1 and CRP2, respectively, while logic gate LG60 generates a bus potential fixing signal CBF.

More specifically, when the logic levels of circuit block designating signals CSBa to CSBd are represented as A to D, and the logic levels of repeater control signals CRP1, CRP2 and bus potential fixing signal CBF as E, F and G, respectively, E, F and G can be represented by the Boolean expressions (1), (2) and (3) of A to D.

$$E = A + B \quad (1)$$
$$F = C + D \quad (2)$$
$$G = \overline{A + B + C + D} \quad (3)$$

Therefore, when data is output from circuit block 10-*a* or 10-*b* connected to bus node Nb1, repeater control signal CRP1 is activated (H level), and tristate buffer 51 amplifies the data on bus node Nb1 and transmits the data to bus node Nb2.

When data is output from circuit block 10-*c* or 10-*d* connected to bus node Nb2, repeater control signal CRP2 is activated (H level), and tristate buffer 51 amplifies the data on bus node Nb2 and transmits the data to bus node Nb1.

When data is input to/output from none of the circuit blocks 10-*a* to 10-*d* connected to the data bus, that is, when the data bus is unused, bus potential fixing signal CBF is set to the active state (H level). Tristate buffers 50 and 51 are both inactivated and enter high-impedance state.

In the description of the embodiments, as in the example of FIG. 9, control signals used at the time of data input to various circuit blocks are not shown for the simplicity of the drawings.

Bi-directional bus circuitry 800 is characterized in that it further includes bus potential fixing circuits 860 and 865 for connecting the bus node to the ground node 95 when the data bus is not used. The ground node 95 supplies the ground potential GND which corresponds to the L level of the data transmitted over the data bus.

Bus potential fixing circuit 860 includes a transistor QN1 connected between bus node Nb1 and ground node 95. Similarly, bus potential fixing circuit 865 has a transistor QN2 connected between bus node Nb2 and the ground node 95.

Transistors QN1 and QN2 are N type field effect transistors which turn on/off in response to the bus potential fixing signal CBF, and an N type MOS transistor is a representative example applied thereto.

Because of this configuration, when the data bus is not used, all the circuit block designating signals CSBa to CSBd attain to the inactive state (L level), and therefore transistors QN1 and QN2 are turned on in response to activation (H level) of the bus potential fixing signal CBF. As a result, bus nodes Nb1 and Nb2 are connected to the ground node 95 and potential level of each bus node is fixed at the ground potential.

When the data bus is used, any of the circuit block designating signals CSBa to CSBd is activated and attains to the H level, so that the bus potential fixing signal CBF is inactivated (L level) and transistors QN1 and QN2 are both turned off. Therefore, potential levels of bus nodes Nb1 and Nb2 are not influenced by the ground node 95.

Therefore, in the configuration of bi-directional bus circuitry 800 shown in FIG. 1, it is possible to fix the potential level of the data bus when it is not used. Therefore, the problem caused when the potential level of the data bus is unfixed as described above can be avoided.

In the bi-directional bus circuitry 800, however, a transistor for fixing the potential level when the data bus is not used is connected to each of bus nodes Nb1 and Nb2. Therefore, because of the influence of the parasitic capacitances of these transistors, the data transmission rate when the data bus is used becomes slower.

More specifically, when the data bus is used, transistors QN1 and QN2 are both turned off. At this time, because of the parasitic capacitances of the drains in transistors QN1 and QN2, the parasitic resistance of the data bus increases, delaying data transmission.

This phenomenon is more problematic when it becomes necessary to provide a large number of repeater circuits for signal amplification, as the data bus becomes longer.

[First Embodiment]

Figure 2:
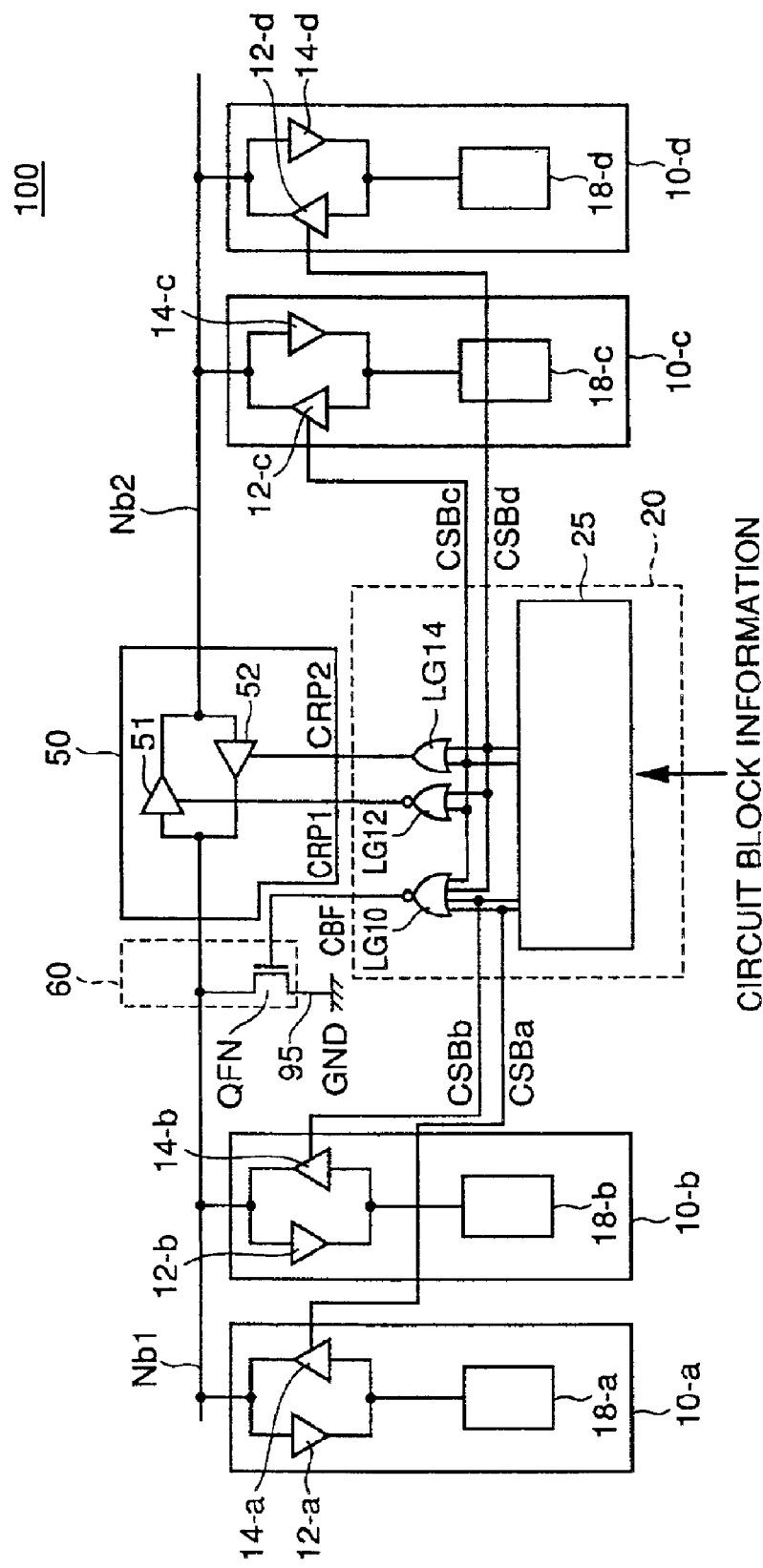
FIG. 2 is a block diagram representing a configuration of a bi-directional bus circuitry 100 in accordance with the first embodiment of the present invention.

Referring to FIG. 2, the bi-directional bus circuitry 100 in accordance with the first embodiment includes a data bus divided into bus nodes Nb1 and Nb2 by a repeater circuit 50 for bi-directional signal transmission between bus nodes Nb1 and Nb2, a bus potential fixing circuit 60 for fixing the potential level of bus node Nb1 when the data bus is not used, and an arbiter circuit 20 controlling the operations of repeater circuit 50 and bus potential fixing circuit 60, based on circuit block information designating the circuit block on which data input/output is to be executed.

Bi-directional bus circuitry 100 transmits the data input to/output from circuit blocks 10-a to 10-d, by the data bus divided into bus nodes Nb1 and Nb2. Here, the four circuit blocks 10-a to 10-d are examples only, and the configuration of bi-directional bus circuitry 100 in accordance with the first embodiment is applicable to an arbitrary number of circuit blocks, as will be apparent from the following description.

The configuration of the circuit blocks 10-a to 10-d is the same as described with reference to FIG. 1, and therefore, description is not repeated.

Repeater circuit 50 includes, as in the bi-directional circuitry 800, a tristate buffer 51 for amplifying and transmitting a signal in the direction from bus node Nb1 to bus node Nb2, and a tristate buffer 52 amplifying and transmitting a signal in the direction from bus node Nb2 to bus node Nb1.

Figure 3:
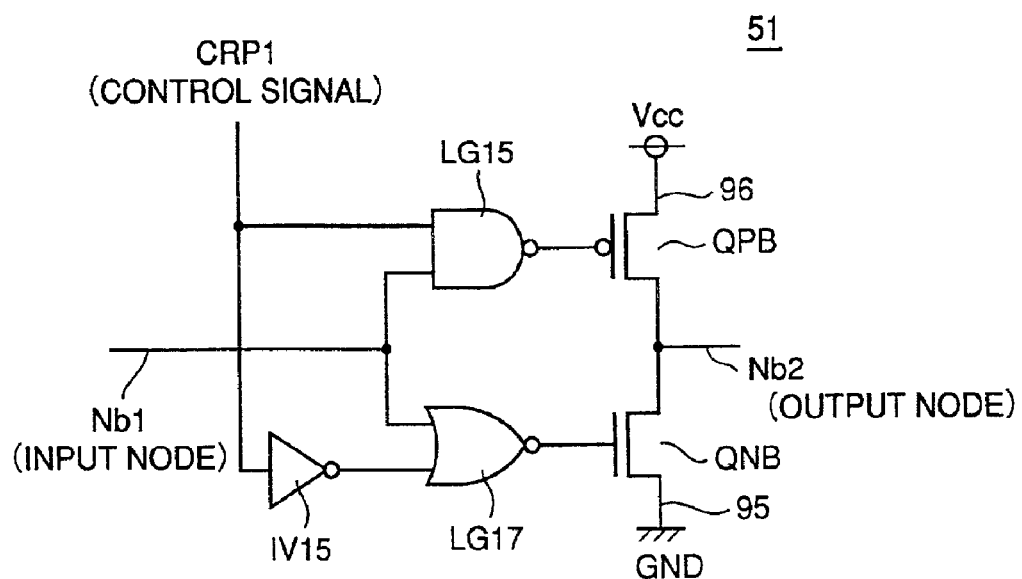
FIG. 3 is a schematic diagram showing a configuration of a tristate buffer 51.

Referring to FIG. 3, the configuration of tristate buffer 51 in repeater circuit 50 will be described as a representative. The configuration described below is also applicable to tristate buffer 52 included in repeater circuit 50 as well as to output buffers 14-a to 14-d of respective circuit blocks.

Referring to FIG. 3, tristate buffer 51 includes a logic gate LG15 providing as an output the result of an NAND logical operation of signal levels at bus node Nb1 as an input node and repeater control signal CRP1 as a control signal, an inverter IV15 inverting the signal level of repeater control signal CRP1, and a logic gate LG17 providing as an output the result of an NOR logic operation of an output from inverter IV15 and the signal level of bus node Nb1.

Tristate buffer 51 further includes a P type MOS transistor QPB receiving at its gate the output of logic gate LG15 and connected between a power supply node 96 and bus node Nb2 as an output node, and an N type MOS transistor QNB receiving at its gate the output of logic gate LG17 and connected between bus node Nb2 and the ground node 95.

Because of this configuration, when the repeater control signal CRP1 as the control signal is active (H level), either the transistor QPB or QNB turns on in response to the signal level of bus node Nb1 as the input node, so that the signal level of bus node Nb1 is amplified and output to output node Nb2.

More specifically, the signal levels output from logic gates LG15 and LG17 are the inversion of the signal level at the input node (bus node Nb1).

Therefore, if the signal level at the input node is H (high), transistor QPB turns on, so that the output node (bus node Nb2) is connected to the power supply node 96. When the signal level at the input node is L (low), transistor QNB turns on, so that the output node is connected to the ground node 95.

When the repeater control signal CRP1 as the control signal is inactive (L level), the signal levels output from logic gates LG15 and LG17 are fixed at H and L levels, respectively, regardless of the signal level at the input node (bus node Nb1). Therefore, when the control signal is inactive (L level), transistors QPB and QNB do not turn on, and therefore the output node is set to the high-impedance state.

Therefore, by the circuit configuration shown in FIG. 3, it is possible to realize the function of the tristate buffer as described above.

Further, any signal transmitting circuit which has such a configuration that is activated and inactivated in response to a control signal, transmitting the signal level at the input node to the output node when activated and electrically disconnecting the input node from the output node when inactivated, similar to the tristate buffer shown in FIG. 3, may be used in place of the configuration of FIG. 3.

Again referring to FIG. 2, arbiter circuit 20 includes a circuit block control circuit 25, and logic gates LG12, LG14 and LG10 generating repeater control signals CRP1 and CRP2 and the bus potential fixing signal CBF, respectively.

The function of circuit block control circuit 25 is as described with reference to FIG. 1. Therefore, description is not repeated.

Logic gate LG12 provides as the repeater control signal CRP1, the result of an NOR logic operation between circuit block designating signals CSBc and CSBd. Logic gate LG14 provides as the repeater control signal CRP2, which is a complementary signal to the repeater control signal CRP1, the result of an OR logic operation between circuit block designating signals CSBc and CSBd. Logic gate LG10 provides as the bus potential fixing signal CBF, the result of an NOR logic operation of circuit block designating signals CSBa to CSBd.

More specifically, when logic levels of circuit block designating signals CSBa to CSBd are represented as A to D, and the logic levels of repeater control signals CRP1, CRP2 and the potential fixing signal CBF as E, F and G, then E, F and G can be represented by the expression (4) and the Boolean expressions (2) and (3) as already described, using A to D.

$$E=\overline{C+D} \quad (4)$$

$$F=C+D \quad (2)$$

$$G=\overline{A+B+C+D} \quad (3)$$

Therefore, arbiter circuit 20 activates (set to the H level) the bus potential fixing signal CBF when the data bus is not used, that is, when the circuit block designating signals CSDa to CSDd are all inactive (L level).

Bus potential fixing circuit 60 has a transistor QFN connected between the bus node Nb1 and the ground node 95 and receiving at its gate the bus potential fixing signal CBF. Transistor QNF is an N type field effect transistor which turns on/off in response to the bus potential fixing signal CBF, and an N-type MOS transistor is a representative example applied thereto.

Therefore, when the data bus is not used, bus potential fixing circuit 60 fixes the potential level of bus node Nb1 to the ground potential GND, as the transistor QFN is turned on.

When data output is designated in either of the circuit blocks 10-c and 10-d connected to bus node Nb2, repeater control signal CRP2 is activated (H level), and tristate buffer 52 is activated and function as a buffer. In this case, repeater control signal CRP1 is complementarily inactivated (L level), and therefore tristate buffer 51 is set to the high-impedance state.

When data output is not executed by either of the circuit blocks 10-c and 10-d, that is, when circuit block designating signals CSBc and CSBd are both inactive (L level), conversely, repeater-control signal CRP1 is activated (H level), and the repeater control signal CRP2 is inactivated (L level). In response, tristate buffers 51 and 52 are activated and inactivated, respectively, a signal is transmitted from bus node Nb1 to bus node Nb2, and tristate buffer 52 is set to the high-impedance state.

When the data bus is not used, repeater control signal CRP1 is activated and CRP2 is inactivated. Therefore, by the activated tristate buffer 51, the potential level of bus node Nb1 is transmitted to bus node Nb2. By such a configuration, it becomes possible to fix the potential levels of bus nodes Nb1 and Nb2 both to the ground potential when the data bus is not used, even in such a structure that has the bus potential fixing circuit 60 provided only for the bus node Nb1.

Therefore, the bi-directional bus circuitry 100 in accordance with the first embodiment prevents the potential level of the data bus from being left unfixed when the data bus is not used. Further, the number of transistors for fixing the potential when the data bus is not used, which transistors function as parasitic capacitance for the data bus when the data bus is not used can be reduced. Therefore, as compared with the bi-directional bus circuitry 800 shown in FIG. 1, data transmission over the data bus can be attained at higher speed.

In the bi-directional bus circuitry 100 shown in FIG. 2, though bus potential fixing circuit 60 is provided on the side of bus node Nb1, it is only an example, and the bus potential fixing circuit may be provided only on the side of bus node Nb2. In this case, the logic of the repeater control signals may be adjusted such that the direction of signal transmission when the data bus is not used is from bus node Nb2 to bus node Nb1.

[Modification of the First Embodiment]

Figure 4:
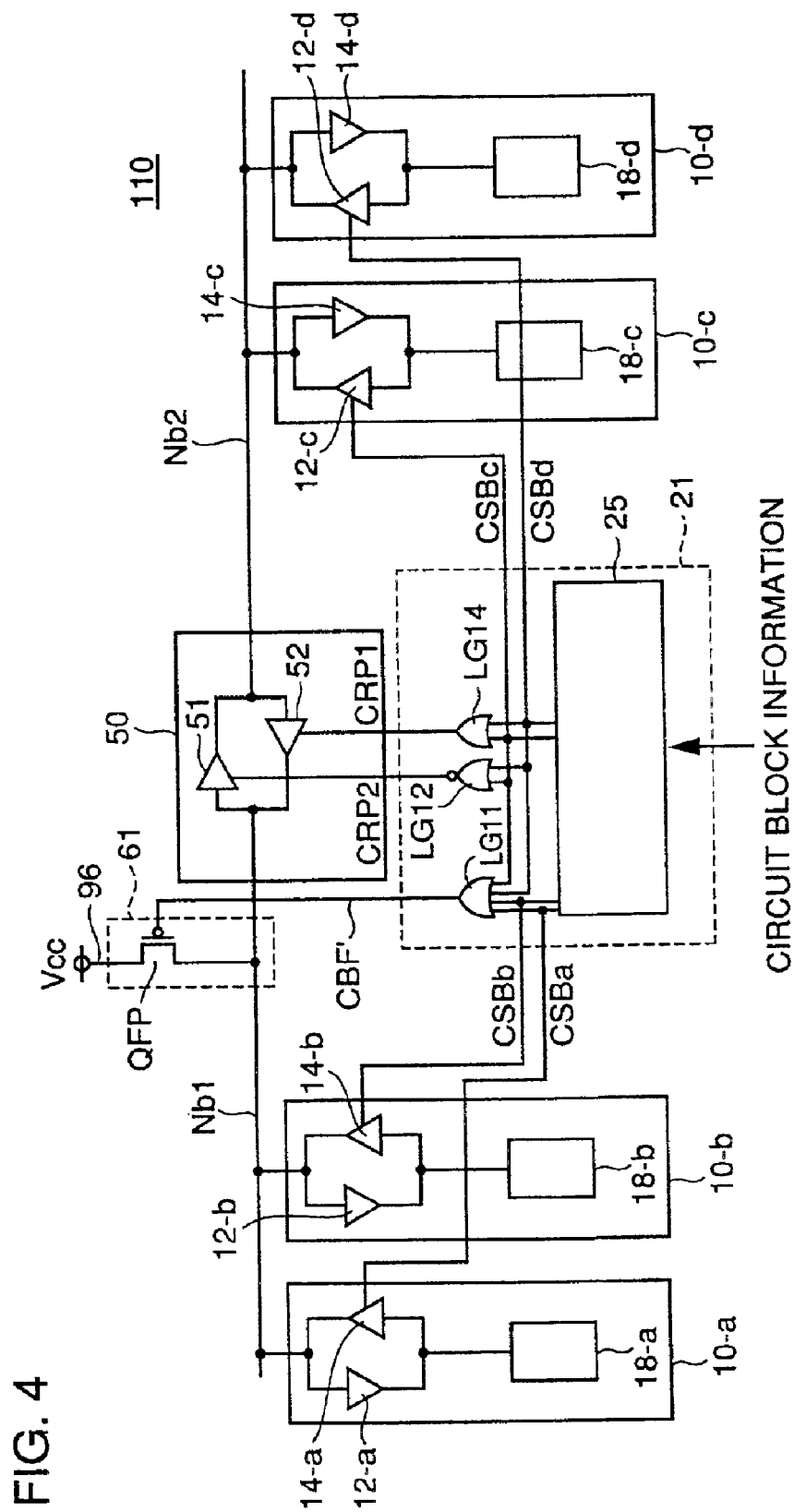
FIG. 4 is a block diagram representing a configuration of a bi-directional bus circuitry 110 in accordance with a modification of the first embodiment.

Referring to FIG. 4, the bi-directional bus circuitry 110 in accordance with a modification of the first embodiment differs from the bi-directional bus circuitry 100 shown in FIG. 2 in that a bus potential fixing circuit 61 and an arbiter circuit 21 are provided in place of bus potential fixing circuit 60 and arbiter circuit 20.

Bus potential fixing circuit 61 is, as bus potential fixing circuit 60, for fixing the potential level of bus node Nb1 when the data bus is not used.

It is different, however, that the bus potential fixing circuit 61 includes a transistor QFP connected between bus node Nb1 and power supply node 96, in place of transistor QFN. Transistor QFP is a P type field effect transistor which turns on/off in response to a bus potential fixing signal CBF', and a P type MOS transistor is a representative example applied thereto.

Therefore, when the data bus is not used, bus potential fixing circuit 61 fixes the potential level of bus node Nb1 at the power supply potential Vcc, as the transistor QFP turns on. Power supply potential Vcc corresponds to the H level of the data transmitted over the data bus.

Arbiter circuit 21 has a configuration similar to that of arbiter circuit 20. It differs, however, that the bus potential fixing signal CBF' is generated by an OR gate LG11, in place of the logic gate LG10, which is an NOR gate.

When the logic levels of circuit block designating signals CSBa to CSBd are represented as A to D and the logic level of bus potential fixing signal CBF' is represented as G', G' can be given by the following Boolean expression (5).

$$G'=A+B+C+D \quad (5)$$

The bus potential fixing circuit CBF' is activated when the data bus is not used, and the signal level is set to the L level.

Other configuration and operation of the circuitry are the same as those of the bi-directional bus circuitry 100 in accordance with the first embodiment. Therefore, description is not repeated.

Because of this configuration, even in the structure in which the potential level of each bus node when the data bus is not used is fixed by the potential level corresponding to the H level of the data transmitted over the data bus, similar effects as attained by the bi-directional bus circuitry in accordance with the first embodiment can also be attained.

[Second Embodiment]

The second embodiment is directed to a configuration of a bi-directional bus circuitry when provision of a number of repeater circuits is necessary as the data bus becomes longer.

Figure 5:
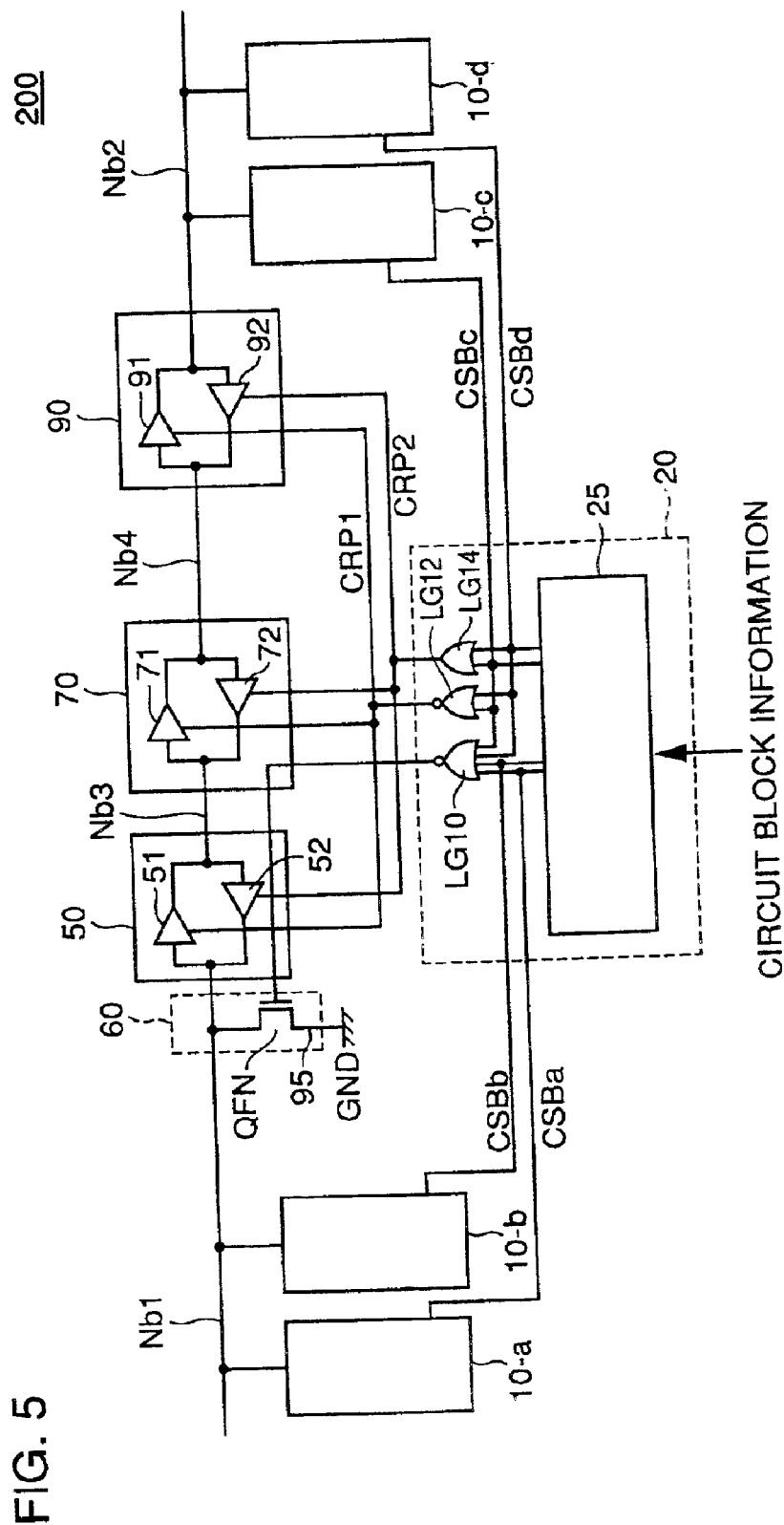
FIG. 5 is a block diagram representing a configuration of a bi-directional bus circuitry 200 in accordance with a second embodiment of the present invention.

Referring to FIG. 5, a bi-directional bus circuitry 200 in accordance with the second embodiment includes, in addition to repeater circuit 50, repeater circuits 70 and 90. Thus, the data bus of the bi-directional bus circuitry 200 comes to be divided into four bus nodes, that is, bus nodes Nb1 to Nb4.

Repeater circuits 70 and 90 have similar configurations as repeater circuit 50 described with the reference to the first embodiment. More specifically, repeater circuits 70 and 90 include tristate buffers 71 and 91 transmitting a signal in the same direction as tristate buffer 51, and tristate buffers 72 and 92 transmitting a signal in the same direction as tristate buffer 52, respectively.

Repeater circuits 70 and 90 are controlled by the repeater control signals CRP1 and CRP2 common to repeater circuit 50. When repeater control signal CRP1 is activated (H level), tristate buffers 51, 71 and 91 are activated, and a signal is transmitted in the direction of bus node Nb1→Nb3→Nb4→Nb2.

When repeater control signal CRP2 is activated (H level), tristate buffers 52, 72 and 92 are activated, and the signal is transmitted in the direction of bus node Nb2→Nb4→Nb3→Nb1. The configuration and operation of arbiter circuit 20 are the same as those of the first embodiment, and therefore, description thereof is not repeated.

In FIG. 5, the number of repeater circuits is 3 and the data bus is divided into four bus nodes as examples only. As will be apparent from the following description, the configuration of the bi-direction bus circuitry in accordance with the second embodiment is applicable to any configuration where there are a plurality of repeater circuits and the data bus is divided into three or more bus nodes.

Bi-directional bus circuitry 200 further includes a bus potential fixing circuit 60 for fixing the potential level of bus node Nb1 at the ground potential when the data bus is not used. As in the first embodiment, bus potential fixing circuit 60 connects bus node Nb1 to ground node 95 when data bus is not used, in response to bus potential fixing signal CBF, so as to fix the potential level of bus node Nb1 to ghe ground potential GND.

As in the first embodiment, when the data bus is not used, tristate buffers 51, 71 and 81 in repeater circuits 50, 70 and 80 are activated, and therefore, the fixed potential level of bus node Nb1 is transmitted by respective repeater circuits to bus nodes Nb3, Nb4 and NB2.

Because of this configuration, even when the data bus is divided into three or more by the repeater circuits, it becomes possible to fix the potential levels of all bus nodes of the data bus simply by providing a bus potential fixing circuit at a bus node positioned at an end portion. Therefore, the problem of malfunction or failure resulting from unfixed potential of the data bus can be prevented. Further, only one bus potential fixing circuit is sufficient. Therefore, decrease in data transmission rate when the data bus is used can be prevented.

Though a bus potential fixing circuit is provided for data bus Nb1 in bi-directional bus circuitry 200, it is possible to provide the bus potential fixing circuit on the other bus node Nb2 positioned at an end portion. In this case, the logic level of repeater control signal may be changed so that the direction of signal transmission when the data bus is not used is from bus node Nb2 to bus node Nb1.

More specifically, in the bi-directional bus circuitry 200 in accordance with the second embodiment, among the three or more divided bus nodes, the bus potential fixing circuit is provided for either one of the bus nodes at opposing end portions and directions of signal transmission by respective repeater circuits are aligned, whereby the potential level at each bus node is fixed when the data bus is not used. Such configuration is advantageous in that the repeater control signal for respective repeater circuits can be shared.

Further, in the bi-directional bus circuitry 200, the configuration of bus potential fixing circuit 61 shown in FIG. 4 may be adopted as the configuration of the bus potential fixing circuit, to attain similar effects.

[Modification of the Second Embodiment]

In a modification of the second embodiment, a configuration in which the bus potential fixing circuit is provided corresponding to a bus node other than those at the opposing end portions, where the data bus is divided into three or more bus nodes as in the second embodiment, will be described.

Figure 6:
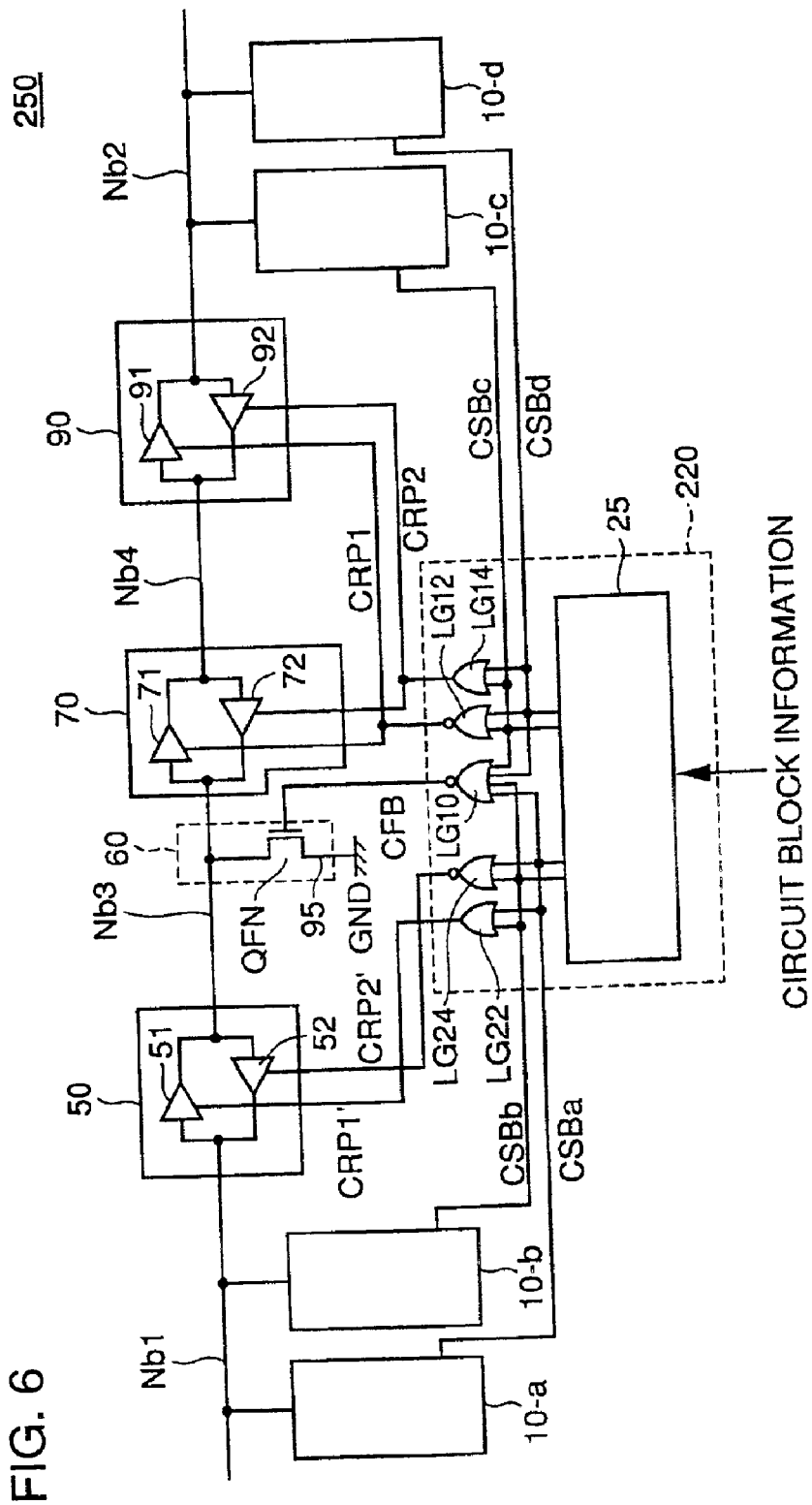
FIG. 6 is a block diagram representing a configuration of a bi-directional bus circuitry 250 in accordance with a modification of the second embodiment of the present invention.

Referring to FIG. 6, the bi-directional bus circuitry in accordance with the modification of the second embodiment includes, as the bi-directional bus circuitry 200, a data bus divided into bus nodes Nb1 to Nb4 divided by repeater circuits 50, 70 and 90. The configurations and operations of repeater circuits 70 and 90 are the same as those of bi-directional circuitry 200. Therefore, description thereof is not repeated.

In FIG. 6, similar to FIG. 5, the number of repeater circuits is 3 and the data bus is divided into four bus nodes. These numbers, however, are examples only. The configuration of the bi-directional bus circuitry in accordance with the modification of the second embodiment may be applicable to any configuration in which the data bus is divided into three or more bus nodes.

Different from bi-directional bus circuitry 200, bi-directional bus circuitry 250 includes a bus potential fixing circuit 60 provided for an intermediate bus node Nb3. Bi-directional bus circuitry 250 includes, in place of arbiter circuit 20, an arbiter circuit 220 for fixing potential levels of all bus nodes when the data bus is not used, by the bus potential fixing circuit provided for the intermediate node.

Except this point, the circuit configuration and the operation are the same as those of bi-directional bus circuitry 200 in accordance with the second embodiment above. Therefore, description thereof is not repeated.

Arbiter circuit 220 includes, in addition to the configuration of arbiter circuit 20, logic gates LG22 and LG24. Logic gate LG22 provides a repeater control signal CRP1' as a result of an OR logic operation of circuit block designating signals CSBa and CSBb. Logic gate LG24 provides a repeater control signal CRP2' as a result of an NOR logic operation of circuit block designating signals CSBa and CSBb.

More specifically, in FIG. 6, the same repeater control signals as those of FIG. 5 can be used for the repeater circuits 70 and 90 which are positioned on the right side of bus potential fixing circuit 60, while new repeater control signals CRP1' and CRP2' must be provided in order to set the direction of signal transmission when the data bus is not used of repeater circuit 50 positioned on the left of bus potential fixing circuit 60 reverse to the direction of repeater circuits 70 and 90.

When the logic levels of circuit block designating signals CSBa to CSBd are represented as A to D and logic levels of repeater control signals CRP1' and CRP2' are represented as H and I, respectively, the levels H and I can be represented by the Boolean expressions (6) and (7), using A to D.

$$H = A + B \quad (6)$$

$$I = \overline{A + B} \quad (7)$$

In bi-directional bus circuitry 250 having such a configuration, when the data input to/output from either one of circuit blocks 10-$a$ and 10-$b$ is to be transmitted, tristate buffers 51, 71 and 91 are activated and the signal is transmitted over the data bus in the direction from bus node Nb1 to bus node Nb2. When the data bus is used by circuit block 10-$c$ or 10-$d$, tristate buffers 52, 72 and 92 are activated, and the data signal is transmitted over the data bus in the direction from bus node Nb2 to Nb1.

When the data bus is not used, tristate buffers 52, 71 and 91 are activated, and the potential level of bus node Nb3 fixed at the ground potential by bus potential fixing circuit 60 is transmitted to bus nodes Nb1, Nb4 and Nb2, and therefore, by one bus potential fixing circuit 60 provided for bus node Nb3, it becomes possible to fix the potential levels of all the bus nodes at the ground potential.

Because of this configuration, in bi-directional bus circuitry 250, the bus potential fixing circuit is arranged for an intermediate bus node other than the bus nodes at opposing ends, among three or more divided bus nodes.

Therefore, the distance of transmission of the potential level fixed by the bus potential fixing circuit when the data bus is not used to other bus nodes becomes shorter. Therefore, fixing of the potential level of each bus node when the data bus is not used can be attained faster.

In bi-directional bus circuitry 250, the configuration of bus potential fixing circuit 61 may be adapted as the configuration of bus potential fixing circuit, to attain similar effects.

[Third Embodiment]

In the third embodiment, a configuration will be described in which each repeater circuit is used as a latch circuit when the data bus is not used, so as to enable fixing of the potential level when the data bus is not used, without providing any potential fixing circuit.

Figure 7:
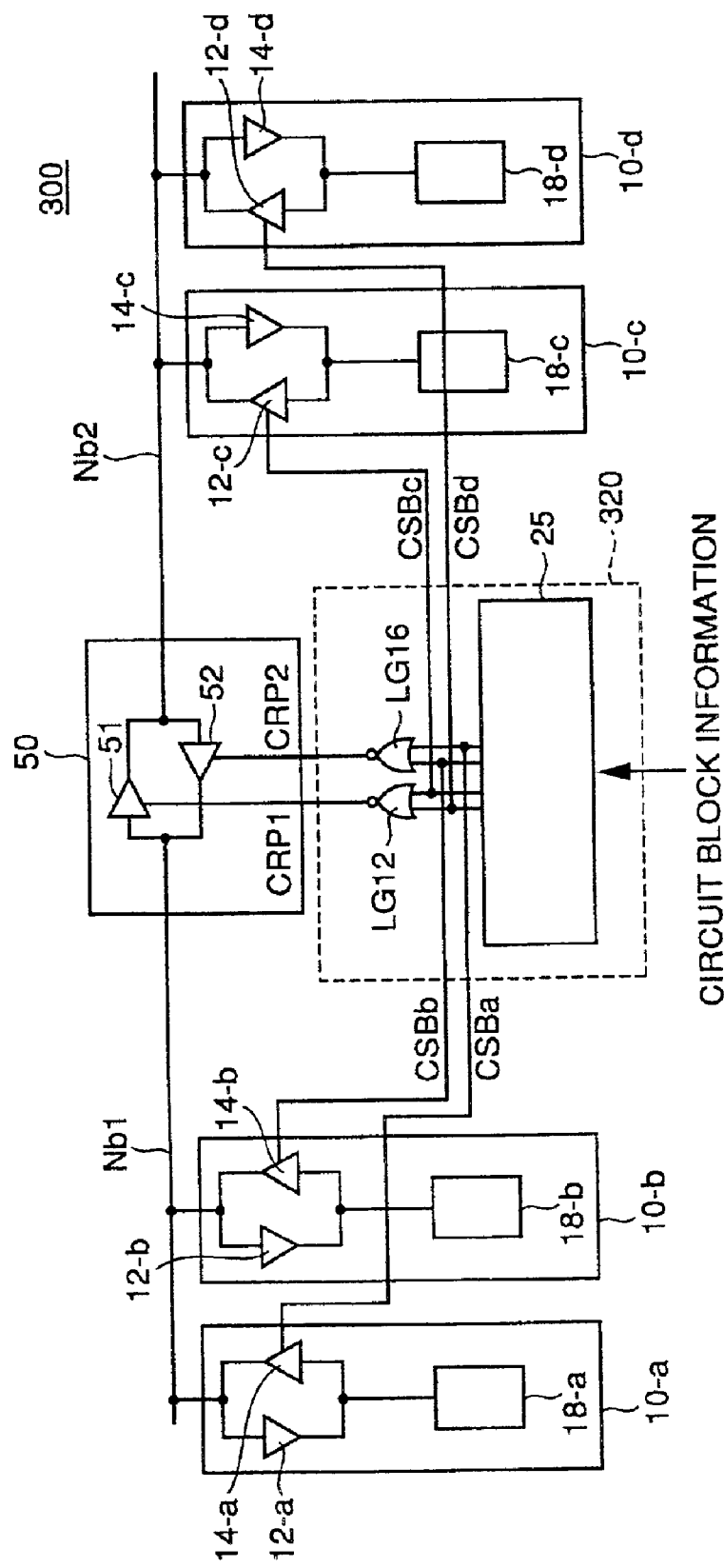
FIG. 7 is a block diagram representing a configuration of a bi-directional bus circuitry 300 in accordance with a third embodiment of the present invention.

Referring to FIG. 7, a bi-directional bus circuitry 300 in accordance with the third embodiment is different from the bi-directional bus circuitry 100 in accordance with the first embodiment in that an arbiter circuit 320 is provided in place of arbiter circuit 20, and that bus potential fixing circuit 60 is not provided.

Arbiter circuit 320 has logic gates LG12 and LG16 generating repeater control signals CRP1 and CRP2, respectively. Logic gate LG12 provides the repeater control signal CRP1 as a result of an NOR logic operation of circuit block designating signals CSBc and CSBd. Logic gate LG16 provides the repeater control signal CRP2 as a result of an NOR logic operation of circuit block designating signals CSBa and CSBb.

When the logic levels of circuit block designating signals CSBa to CSBd are represented as A to D and the logic levels of repeater control signals CRP1 and CRP2 generated by arbiter circuit 320 as E and F, respectively, the levels E and F can be represented by the Boolean expressions (8) and (9) using A to D.

$$E = \overline{C+D} \quad (8)$$

$$F = \overline{A+B} \quad (9)$$

Therefore, when neither circuit block 10-c nor 10-d is used, logic gate LG12 activates (H level) the repeater control signal CR1. When neither circuit block 10-a nor 10-b is used, logic gate LG16 activates (H level) the repeater control signal CRP2.

As a result, when data is output from either one of circuit blocks 10a and 10-b, bi-directional bus circuitry 300 activates tristate buffer 51 and sets tristate buffer 52 to the high-impedance state, as circuit blocks 10-c and 10-d are not used.

When data is to be output from either one of circuit blocks 10-c and 10-d, bi-directional bus circuitry 300 activates tristate buffer 52 and sets tristate buffer 51 to the high-impedance state, as circuit blocks 10-a and 10b are not used.

Accordingly, when data is to be output from any of the circuit blocks, it is possible to transmit data successively between respective bus nodes.

When the data bus is not used, arbiter circuit 320 activates (H level) both repeater control signals CRP1 and CRP2, and therefore tristate buffers 51 and 52 are both activated and amplify data.

Accordingly, in repeater circuit 50, a latch circuit is formed by tristate buffers and 51 and 52, and therefore, when the data bus is not used, potential levels of bus nodes Nb1 and Nb2 immediately before the use of the data bus is stopped are maintained, respectively.

Because of this configuration, it becomes possible to fix the potential level of each bus node when the data bus is not used either to the power supply potential level or the ground potential level, that is, either one of the signal levels of the data, without the necessity of providing any bus potential fixing circuit, and the potential level of the data bus can be prevented from being left unfixed.

As compared with arbiter circuit 20 in accordance with the first 11 embodiment, a logic gate LG10, which is a 4-input NOR gate, is unnecessary in the configuration of arbiter circuit 320.

As a result, the bi-directional bus circuitry 300 in accordance with the third embodiment realizes the similar effects as attained by the bi-directional bus circuitry 100 in a smaller area.

Further, as it is unnecessary to separately provide a transistor for fixing the bus potential, parasitic capacitance when the data bus is used can be suppressed as compared with the bi-directional bus circuitry 100. Therefore, it is possible to prevent the potential level of the data bus from being left unfixed when the data bus is not used, while not lowering the data transmission rate when the data bus is used.

[Modification of the Third Embodiment]

Figure 8:
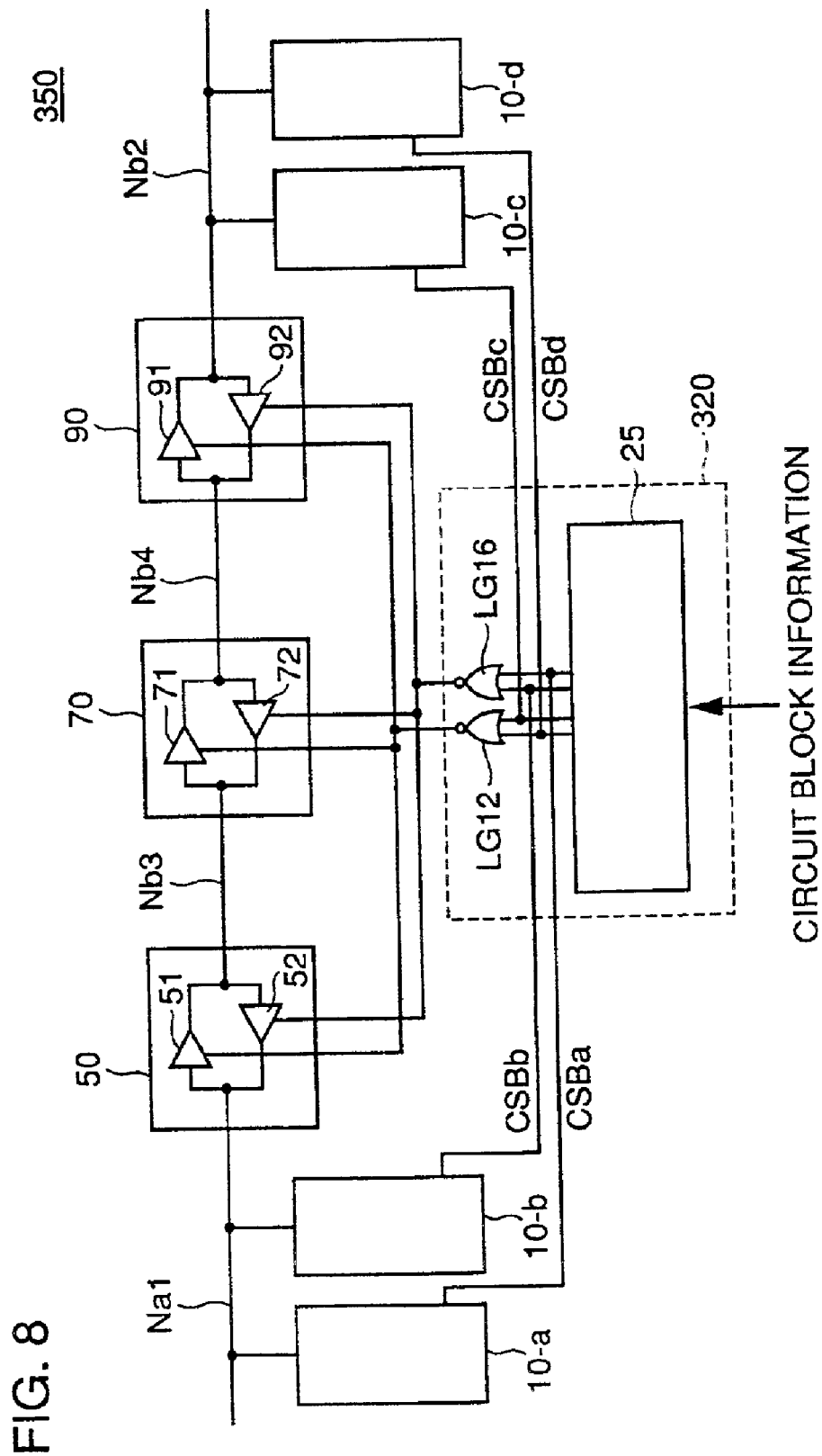
FIG. 8 is a block diagram representing a configuration of a bi-directional bus circuitry 350 in accordance with a modification of the third embodiment.

Referring to FIG. 8, a bi-directional bus circuitry 350 in accordance with a modification of the third embodiment differs from bi-directional bus circuitry 300 in that repeater circuits 70 and 90 are provided in addition to repeater circuit 50. Thus, the data bus of bi-directional bus circuitry 350 is divided into four bus nodes, that is, bus nodes Nb1 to Nb4.

Repeater circuits 70 and 90 include tristate buffers 71 and 91 transmitting a signal in the same direction as tristate buffer 51, and tristate buffers 72 and 92 transmitting the signal in the same direction as tristate buffer 52, respectively.

Each of the tristate buffers 71 and 91 is controlled by repeater control signal CRP1 common to tristate buffer 51, and each of tristate buffers 72 and 92 is controlled by repeater control signal CRP2 common to tristate buffer 52.

In FIG. 8, the number of repeater circuit is 3 and the data bus is divided into four bus nodes. These numbers, however, are examples only. The configuration of the bi-directional bus circuitry in accordance with the modification of the third embodiment is applicable to any configuration in which the data bus is divided into three or more bus nodes.

As described above, even when the data bus is long and it is necessary to provide a plurality of repeater circuits, that is, when the data bus is divided into three or more bus nodes, similar effects as attained by bi-directional bus circuitry 300 can be attained as repeater control signals CRP1 and CRP2 are shared by the repeater circuits.

Although the present invention has been described and illustrated in detail, it is clearly understood that the same is by way of illustration and example only and is not to be taken by way of limitation, the spirit and scope of the present invention being limited only by the terms of the appended

What is claimed is:

1. A bi-directional bus circuitry shared among a plurality of circuit blocks, comprising:

a data bus divided into (J+1) (J: natural number being 1 or more than 1) bus nodes, each of said plurality of circuit blocks being connected to one of said (J+1) bus nodes;

a potential fixing circuit provided corresponding to one of said (J+1) bus nodes, for setting potential level of corresponding said bus node to a prescribed potential when data is input to/output from none of said plurality of circuit blocks;

J repeater circuits provided between adjacent said bus nodes respectively, each repeater circuit having a first signal transmitting circuit transmitting data from one to the other of said adjacent bus nodes, and a second signal transmitting circuit transmitting data from said the other to said one of said adjacent bus nodes; and an arbiter circuit receiving circuit block information for specifying a circuit block which is an object of data output, and controlling activation of said first and second signal transmitting circuits, said arbiter circuit activating, when said data is input to/output from none of said plurality of circuit blocks, either one of said first and second signal transmitting circuits in each repeater circuit, so that potential level of said bus node corresponding to said potential fixing circuit is transmitted to said data bus entirely.

2. The bi-directional bus circuitry according to claim 1, wherein said first signal transmitting circuit includes a first tristate buffer connected in a direction from said one to said the other of said adjacent bus nodes and controlled by said arbiter circuit, and said second signal transmitting circuit has a second tristate buffer connected in a direction from said the other to said one of said adjacent bus nodes and controlled by said arbiter circuit.

3. The bi-directional bus circuitry according to claim 1, wherein

J is 1;

said plurality of circuit blocks is divided into a first circuit block group connected to one of two bus nodes, and a second circuit block group connected to the other of said two bus nodes;

said potential fixing circuit is provided corresponding to either one of said two bus nodes;

said first signal transmitting circuit is provided for transmitting data from said one to said the other of said two bus nodes;

said second signal transmitting circuit is provided for transmitting data from said the other to said one of said two bus nodes; and said arbiter circuit activates said first signal transmitting circuit when data is output from none of said circuit blocks belonging to said second circuit block group, and activates said second signal transmitting circuit when data is output from at least one of said circuit blocks belonging to said second circuit block group.

4. The bi-directional bus circuitry according to claim 1, wherein data transmitted over said data bus has two states of high level and low level;

said potential fixing circuit includes a switch circuit connected between a power supply node supplying a potential level corresponding to either one of said high level and said low level and said corresponding bus node; and said arbiter circuit turns on said switch circuit when said data bus is not used.

5. The bi-directional bus circuitry according to claim 4, wherein said power supply node supplies a potential level corresponding to said low level, and said switch circuit has an N type field effect transistor.

6. The bi-directional bus circuitry according to claim 4, wherein said power supply node supplies a potential level corresponding to said high level, and said switch circuit has a P type field effect transistor.

7. The bi-directional bus circuitry according to claim 1, wherein

J is at least 2; and said potential fixing circuit is provided corresponding to one of (J−1) bus nodes among said (J+1) bus nodes other than two bus nodes positioned at opposing ends.

8. The bi-directional bus circuitry according to claim 1, wherein

J is at least 2; and said potential fixing circuit is provided corresponding to either one of two bus nodes positioned at opposing ends, among said (J+1) bus nodes.

9. The bi-directional bus circuitry according to claim 8, wherein said plurality of circuit blocks is divided into a first circuit block group connected to one of said two bus nodes positioned at the opposing ends and a second circuit block group connected to the other of said two bus nodes positioned at the opposing end; and said first and second signal transmitting circuits in each repeater circuit are controlled by first and second control signals which are common to said J repeater circuits.

10. A bi-directional bus circuitry shared among a plurality of circuit blocks, comprising:

a data bus divided into (J+1) (J: natural number being 1 or more than 1) bus nodes, each of said plurality of circuit blocks being connected to one of said (J+1) bus nodes;

J repeater circuits arranged between adjacent said bus nodes, each of said repeater circuits including a first signal transmitting circuit transmitting data from one to the other of said adjacent bus nodes, and a second signal transmitting circuit transmitting data from said the other to said one of said adjacent bus nodes; and an arbiter circuit receiving circuit information for specifying a circuit block which is an object of data output, and controlling activation of said first and second signal transmitting circuits in each of said repeater circuits, said arbiter circuit activating both of said first and second signal transmitting circuits in each of said repeater circuits when said data bus is not used, that is, when data is input to/output from none of said plurality of circuit blocks.

11. The bi-directional bus circuitry according to claim 10, wherein said first signal transmitting circuit includes a first tristate buffer connected in a direction from said one to said the other of said adjacent bus nodes and controlled by said arbiter circuit, and said second signal transmitting circuit has a second tristate buffer connected in a direction from said the other to said one of said adjacent bus nodes and controlled by said arbiter circuit.

12. The bi-directional bus circuitry according to claim 10, wherein

J is 1;

said plurality of circuit blocks is divided into a first circuit block group connected to one of two bus nodes, and a second circuit block group connected to the other of said two bus nodes;

said first signal transmitting circuit is provided for transmitting data from said one to said the other of said two bus nodes;

said second signal transmitting circuit is provided for transmitting data from said the other to said one of said two bus nodes; and said arbiter circuit activates said first signal transmitting circuit when data is output from none of said circuit blocks belonging to said second circuit block group, and activates said second signal transmitting circuit when data is not output from any of said circuit blocks belonging to said first circuit block group.

13. The bi-directional bus circuitry according to claim 10, wherein

J is at least 2;

said plurality of circuit blocks is divided into a first circuit block group connected to one of two bus nodes positioned at opposing ends, and a second circuit block group connected to the other of said two bus nodes;

said first signal transmitting circuit in each repeater circuit is provided for transmitting data in a direction from said one to said the other of said two bus nodes;

said second signal transmitting circuit in each repeater circuit is provided for transmitting data in a direction from said the other to said one of said two bus nodes;

said first and second signal transmitting circuits in each repeater circuit are controlled by first and second control signals provided commonly to said J repeater circuits; and said arbiter circuit activates said first signal transmitting circuit in each repeater circuit when data is output from none of said circuit blocks belonging to said second circuit block group, and activates said second signal transmitting circuit in each repeater circuit when data is output from none of said circuit blocks belonging to said first circuit block group.

* * * * *